(12) United States Patent
Heinzelmann

(10) Patent No.: US 9,642,313 B2
(45) Date of Patent: May 9, 2017

(54) HEDGE TRIMMER

(71) Applicant: Andreas Stihl AG & CO. KG, Waiblingen (DE)

(72) Inventor: Georg Heinzelmann, Backnang (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 260 days.

(21) Appl. No.: 14/250,265

(22) Filed: Apr. 10, 2014

(65) Prior Publication Data

US 2014/0215833 A1 Aug. 7, 2014

Related U.S. Application Data

(63) Continuation-in-part of application No. 12/641,221, filed on Dec. 17, 2009, now abandoned.

(30) Foreign Application Priority Data

Dec. 19, 2008 (DE) .................. 10 2008 063 995

(51) Int. Cl.
*A01G 3/053* (2006.01)
*A01G 3/04* (2006.01)

(52) U.S. Cl.
CPC .............. *A01G 3/053* (2013.01); *A01G 3/04* (2013.01)

(58) Field of Classification Search
CPC .......... A01G 3/053; A01G 3/04; A01G 3/047
USPC .......... 30/392, 216–220, 208–210, 393, 394
See application file for complete search history.

(56) References Cited

U.S. PATENT DOCUMENTS

| 4,619,045 | A | * | 10/1986 | Mayer | A01G 3/053 30/216 |
| 5,531,027 | A | * | 7/1996 | Martinez | A01G 3/053 30/216 |
| 5,926,960 | A | | 7/1999 | Heywood et al. | |
| 5,975,862 | A | | 11/1999 | Arahata et al. | |
| 6,446,421 | B1 | * | 9/2002 | Kramer | F02B 63/02 30/381 |
| 7,406,770 | B2 | * | 8/2008 | Mace | A01D 34/14 30/216 |
| 2006/0218796 | A1 | * | 10/2006 | Heinzelmann | A01G 3/053 30/276 |
| 2008/0066325 | A1 | * | 3/2008 | Peterson | A01G 3/053 30/392 |

FOREIGN PATENT DOCUMENTS

| CN | 1839675 | A | 10/2006 |
| CN | 101006763 | A | 8/2007 |
| CN | 200938778 | Y | 8/2007 |
| DE | 151103 | | 4/1903 |
| DE | 92 06 557 | U1 | 8/1992 |
| DE | 44 18 102 | A1 | 12/1995 |
| GB | 2125669 | A | 3/1984 |

* cited by examiner

*Primary Examiner* — Omar Flores Sanchez
(74) *Attorney, Agent, or Firm* — Walter Ottesen, P.A.

(57) ABSTRACT

A hedge trimmer having a drive motor, a gear mechanism, and a blade arrangement with at least one cutter bar, which is driven in a reciprocating manner by the drive motor via the gear mechanism in a longitudinal direction. The blade arrangement includes a guide mechanism that extends over at least a part of the length of the blade arrangement. The guide mechanism is embodied as a molded part that includes a generally flat fastening portion and a profiled guide portion. The cutter bar is longitudinally movably held on the guide portion.

16 Claims, 12 Drawing Sheets

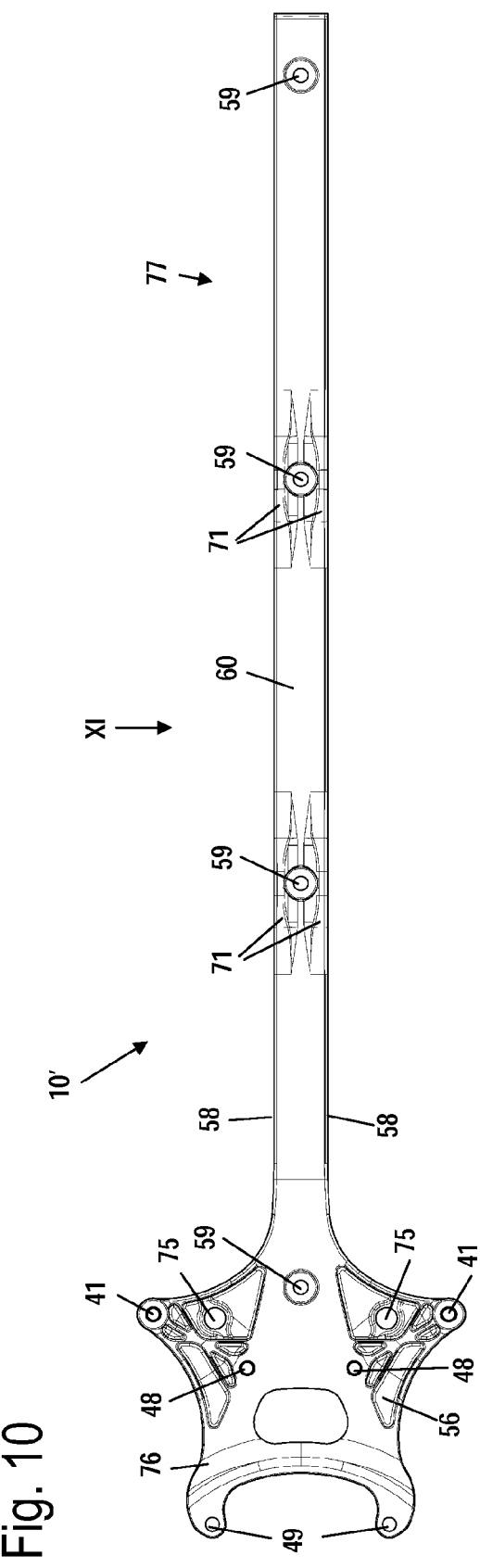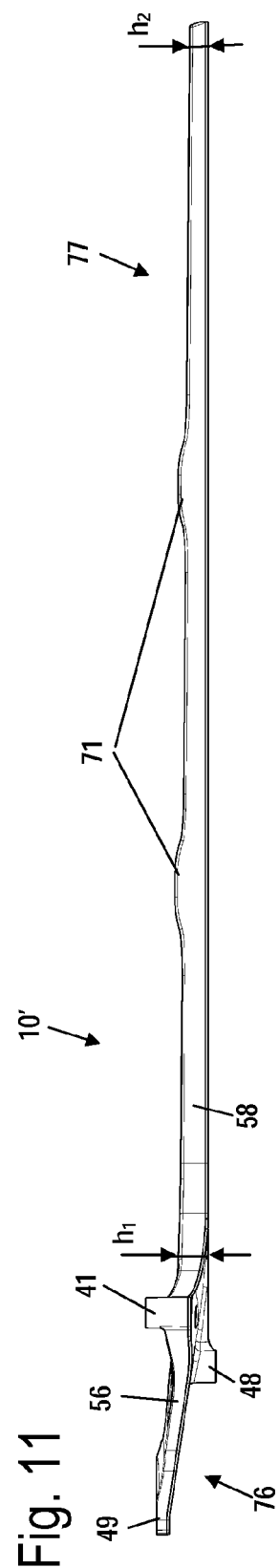

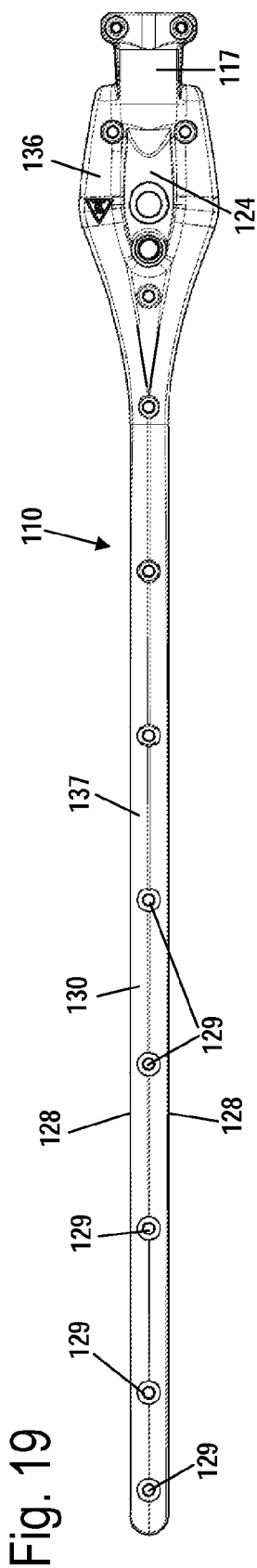
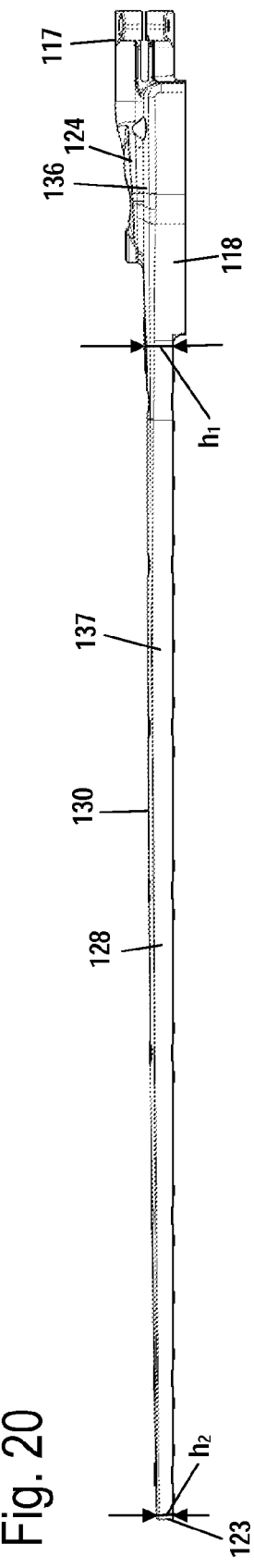
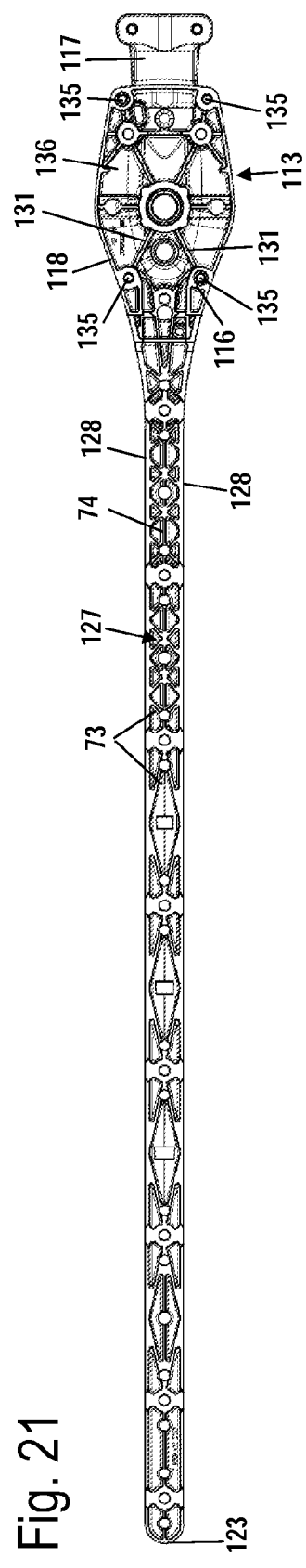
Fig. 19
Fig. 20
Fig. 21

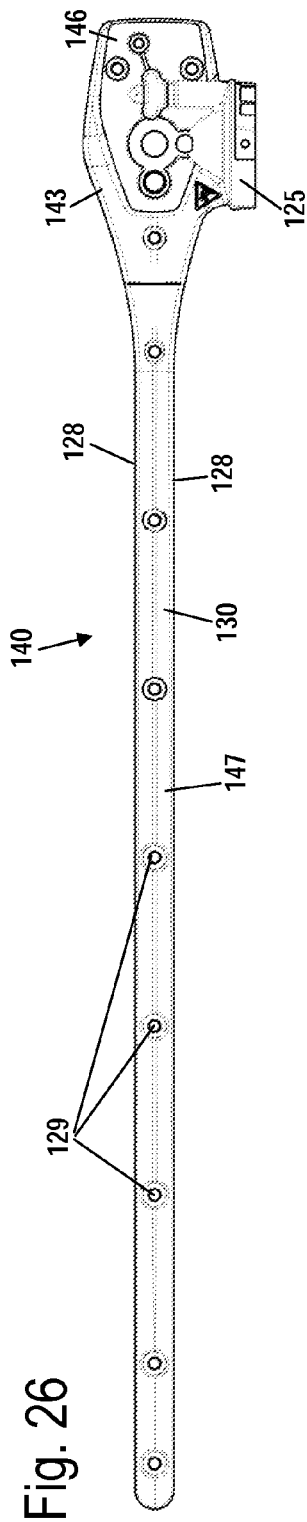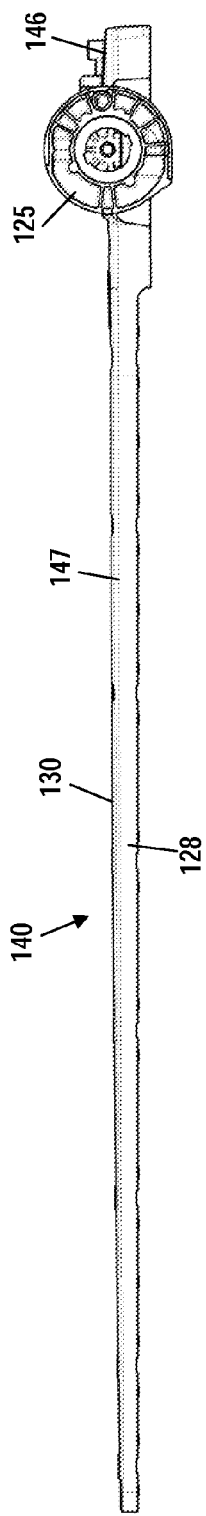

HEDGE TRIMMER

CROSS-REFERENCE TO RELATED APPLICATIONS

The present application is a continuation-in-part application of co-pending U.S. application Ser. No. 12/641,221. The instant application should be granted the priority date of Dec. 19, 2008, the filing date of the corresponding German patent application 10 2008 063 995.8.

BACKGROUND OF THE INVENTION

The present invention relates to a hedge trimmer.

U.S. Pat. No. 5,771,583 discloses a hedge trimmer having a blade arrangement comprising two cutter bars, which are longitudinally movably held on a guide. The guide is embodied as a U-profile which can, for example, be rod stock that is cut to length. Consequently, the guide has the same configuration over its entire length.

DD 151 103 B1 shows a hedge trimmer having a guide that is also embodied as a U-profile. Here, the U-profile is disposed in such a way that the legs of the U face upwardly. In the region of the housing of the hedge trimmer, the profile is divided in the longitudinal direction and is bent apart in order to form two legs for attachment of the profile to the housing of the hedge trimmer.

Heretofore known guides must be comprised of a relatively stable and hence heavy profile in order to have an adequately high strength over the entire length. As a result, the weight of heretofore known hedge trimmers is relatively great.

It is an object of the present invention to provide a hedge trimmer of the aforementioned general type that has a straightforward construction and a low weight.

SUMMARY OF THE INVENTION

The hedge trimmer of the present application comprises a drive motor; a gear mechanism; and a blade arrangement having at least one cutter bar, wherein the cutter bar is driven in a reciprocating manner by the drive motor via the gear mechanism in a longitudinal direction of the blade arrangement, which includes a guide means or mechanism that extends over at least a part of the length of the blade arrangement, wherein the guide means is embodied as a molded part that includes a generally flat fastening portion and a profiled guide portion, and wherein the at least one cutter bar is longitudinally movably held on the profiled guide portion.

Embodying the guide means as a molded part enables a stress-optimized configuration of the guide means. Consequently, in those regions where high forces are active during operation, the guide means can have a relatively rigid and solid configuration, while in those regions where small forces are active, for example at the free ends of the cutter bars, the guide means can have a relatively light weight configuration. Embodying the guide portion as a profile results in a high moment of resistance against bending while still providing a low weight for the guide means. The generally flat configuration of the fastening portion enables connection of the guide means at a number of points, which also in the transverse direction of the hedge trimmer are spaced from one another. Due to the flat configuration, the fastening portion has a low weight yet an adequate strength. By being embodied as a molded part, the guide means can be easily produced in a casting process. The guide means in particular serves to connect the cutter bar with a supporting component of the hedge trimmer. Advantageously, the guide means absorbs forces acting on the blade arrangement during operation perpendicular to the plane of the blade arrangement and conducts the forces directly or indirectly into a support component of the hedge trimmer, for example, a gearbox or a housing, in which the drive motor is arranged.

The fastening portion, in particular, is fixedly connected with a gearbox of the hedge trimmer. Advantageously, the guide means forms a section of the gearbox. The guide means accordingly is formed as one-piece with a section of the gearbox. In this manner, a more simple construction is provided with fewer individual parts, and forces acting on the cutter bar during operation can be conducted effectively into the gearbox.

The guide portion advantageously has a ribbing, which increases the stability of the guide portion while maintaining a low weight. The guide portion can thus have a lightweight construction. In this connection, the ribbing advantageously includes at least one transverse rib that extends transverse to the longitudinal direction of the blade arrangement. Consequently, while having a low weight, a high strength can be achieved. A plurality of transverse ribs is advantageously provided. In this connection, in the region of the guide portion that faces the fastening portion, the transverse ribs are advantageously disposed more densely than in the region that faces away from the fastening portion. The number of transverse ribs per unit of length of the hedge trimmer thus decreases from the fastening portion toward the free end of the guide portion. The stiffness of the guide means is thus adapted to the stresses that are effective during operation. Consequently, on the whole a low weight of the guide means is achieved.

The ribbing advantageously also includes at least one longitudinal rib, which extends in the longitudinal direction of the blade arrangement. The guide portion expediently has an upper side and longitudinal sides, which extend in the longitudinal direction of the blade arrangement, extend from the upper side in the direction toward the cutter bars, and with the upper side form a U-profile. The U-profile is thus closed toward the outside, so that no dirt deposits can occur. The ribbing is advantageously disposed in the space enclosed by the upper side, the longitudinal sides and the cutter bars.

For the connection to the cutter bars, the guide portion advantageously has at least one hole. The stiffness of the guide portion is reduced in the region of the hole. To compensate for the reduction in stiffness, at least one longitudinal rib is disposed on that side of the guide portion that faces away from the cutter bars, and is located at the level of the hole. The longitudinal rib could be provided only in the region of the hole. As a result, a largely constant stiffness of the guide portion can be achieved. However, it can also be expedient for the longitudinal rib to extend over the entire length of the guide portion.

To achieve a high strength of the fastening portion, the fastening portion can be provided with at least one reinforcing rib. At least one longitudinal side of the guide portion expediently merges into the reinforcing rib of the fastening portion. The reinforcing rib and the longitudinal side of the guide portion thereby advantageously form flow channels during the manufacture of the guide means as a cast part. Due to the fact that the longitudinal side merges into the reinforcing rib, the forces that are absorbed in the guide portion can easily be conducted into the fastening portion. Consequently, a high strength of the guide means at a low weight can be achieved.

The drive motor is advantageously an internal combustion engine having a crankcase, and the fastening portion is connected to the crankcase of the internal combustion engine at at least one fastening point. As a result, the forces absorbed by the guide means are conducted directly into the crankcase of the internal combustion engine. The gear mechanism is expediently disposed in a gear box, and the fastening portion is connected to the gear box at at least one fastening point. The fastening portion thus simultaneously serves to reinforce the gearbox. In this way, the gearbox can be designed such that it does not alone absorb the forces that occur during operation. Consequently, the gearbox can have a relatively light configuration. An adequate strength results in conjunction with the fastening portion of the guide means.

The guide means advantageously is connected fixedly with the gearbox. In this manner, the forces acting on the blade arrangement during operation can be conducted at least partially into the gearbox and can be absorbed by the gearbox. Advantageously, it is provided that at least a section of the gearbox is formed as one-piece with the guide means. In particular, the section of the gearbox that is formed as one-piece with the guide means includes the fastening portion. The fastening portion thereby serves preferably for connection to a further part of the gearbox, in particular, with a cover of the gearbox.

The hedge trimmer includes a drive unit, which includes the drive motor, the gear mechanism and the blade arrangement. In this connection, the drive unit is advantageously mounted in a handle housing of the hedge trimmer in a vibration-dampening manner via at least one anti-vibration element. The fastening portion is advantageously connected to the handle housing at at least one fastening point via an anti-vibration element. Due to the direct connection of the handle housing to the fastening portion, a high stability of the hedge trimmer and at the same time a good precision of guidance are achieved. The connection of the fastening portion with the crankcase, the gearbox and the handle housing are made possible by the flat configuration of the fastening portion. The fastening portion advantageously includes at least one fastening opening for the securement of attachments such as, for example, a guide protector or a glide plate. The guide means is in particular a die cast part made of a lightweight metal, especially magnesium.

The gear mechanism includes a toothed gear that is driven by a driving pinion, and that is mounted in the gearbox via a bearing bolt. In this connection, the bearing bolt is advantageously fixedly pressed into the gearbox. As a result, the toothed gear can easily be mounted on the bearing bolt. A straightforward configuration of the gear mechanism results if at least one eccentric component is fixedly connected with the toothed gear, whereby the eccentric component is provided with at least one eccentric, on which is disposed a cutter bar. The eccentric is therefore not monolithically formed with the toothed gear itself, but rather on a separate component. The two-part configuration simplifies the manufacture.

The eccentric component is advantageously comprised of sintered material on which the cutter bar is directly mounted. Embodying the eccentric component of sintered material ensures a good mounting, so that no additional, separate bearings, such as roller bearings, are needed, and can be eliminated. A straightforward configuration results if also the toothed gear is mounted on the bearing bolt via the eccentric component. The eccentric component thus also assumes the bearing function for the tooth gear, so that a separate bearing between the toothed gear or the eccentric component and the bearing bolt can be eliminated.

The hedge trimmer advantageously has two cutter bars, which are respectively driven by an eccentric. The two eccentrics are advantageously disposed on one side of the toothed gear. The arrangement of both eccentrics on one side of the toothed gear results in a straightforward construction. None of the cutter bars has to have a bent or offset configuration. The cutter bars can rest against one another over their entire length. Due to the fact that the eccentrics are formed on a separate eccentric component, the manufacture of both eccentrics on one side of the toothed gear is simple.

Further specific features of the present invention will be described in detail subsequently.

BRIEF DESCRIPTION OF THE DRAWINGS

This object, and other objects and advantages of the present application, will appear more clearly from the following specification in conjunction with the accompanying schematic drawings, in which:

FIG. 10 is a view from above onto an exemplary embodiment of a guide means;

FIG. 11 is a side view taken in the direction of the arrow XI in FIG. 10;

FIGS. 17 through 21 are side views of the guide means of FIGS. 15 and 16;

FIGS. 24 through 28 are side views of the guide means of FIGS. 22 and 23.

DETAILED DESCRIPTION OF SPECIFIC EMBODIMENTS

Figure 1:
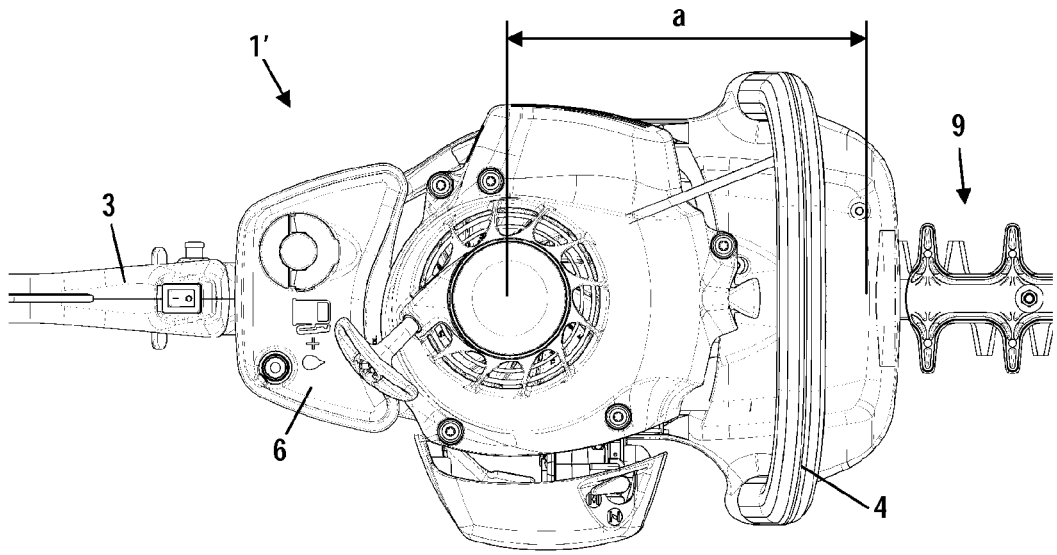
FIG. 1 is a plan view of a hedge trimmer according to the prior art.

Referring now to the drawings in detail, FIG. 1 shows a hedge trimmer 1' according to the prior art. The hedge trimmer 1' has a rear handle 3, and on the opposite side of an engine housing a blade arrangement 9. A tubular handle 4 is provided on that side facing away from the rear handle 3. A tank 6 is disposed between the rear handle 3 and the engine housing. The crankcase of the internal combustion engine of the hedge trimmer 1' is oriented toward the rear handle 3, and the cylinder of the internal combustion engine is oriented toward the blade arrangement 9. As a result, the distance a between the axis of rotation of the crankshaft and the blade arrangement 9 is relatively large.

Figure 2:
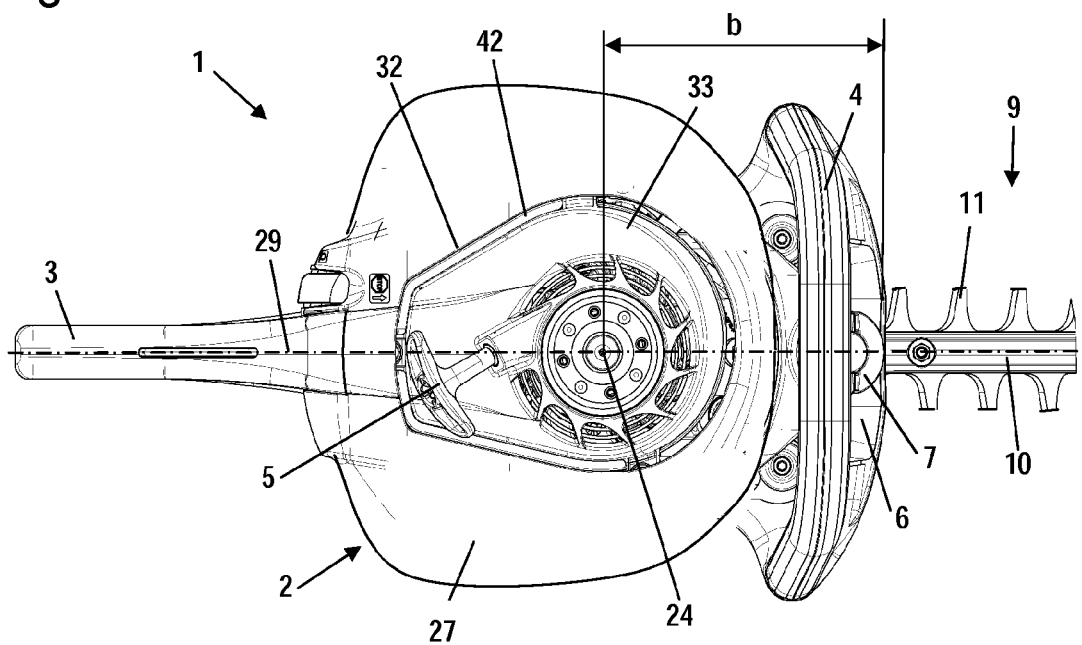
FIG. 2 is a plan view of one exemplary embodiment of a hedge trimmer pursuant to the present application.

The inventive hedge trimmer 1 shown in FIG. 2 has a handle housing 2 on which are disposed a rear handle 3 and a tubular handle 4 for guiding the hedge trimmer 1. A blade arrangement 9 extends to the front at that side of the handle housing 2 that faces away from the rear handle 3. The blade arrangement 9 includes a guide means 10 as well as two blade or cutter bars, with a first cutter bar 11 being shown in FIG. 2. A second cutter bar 12 (FIG. 4) is disposed in a congruent manner below the first cutter bar 11. The blade arrangement 9 extends in the direction of a longitudinal central axis 29 of the hedge trimmer 1; as seen in a plan view onto the hedge trimmer 1, the longitudinal central axis 29 centrally divides the rear handle 3. The longitudinal central axis 29 intersects an axis of rotation 24 of a crankshaft 23 (FIG. 3).

The handle housing 2 includes a lower housing section 28, which is shown in FIGS. 3-7, as well as the housing cover 27 shown in FIG. 2. The housing cover 27 has a recess 32, in which is disposed a fan wheel cover 33. A vibration gap 42 is formed between the edge of the housing cover 27 and the fan wheel cover 33. The fan wheel cover 33 is part of a drive unit 22 (FIG. 3), which is mounted in the handle housing 2 in a vibration-dampening or shock-absorbing manner via anti-vibration elements 36.

Figure 3:
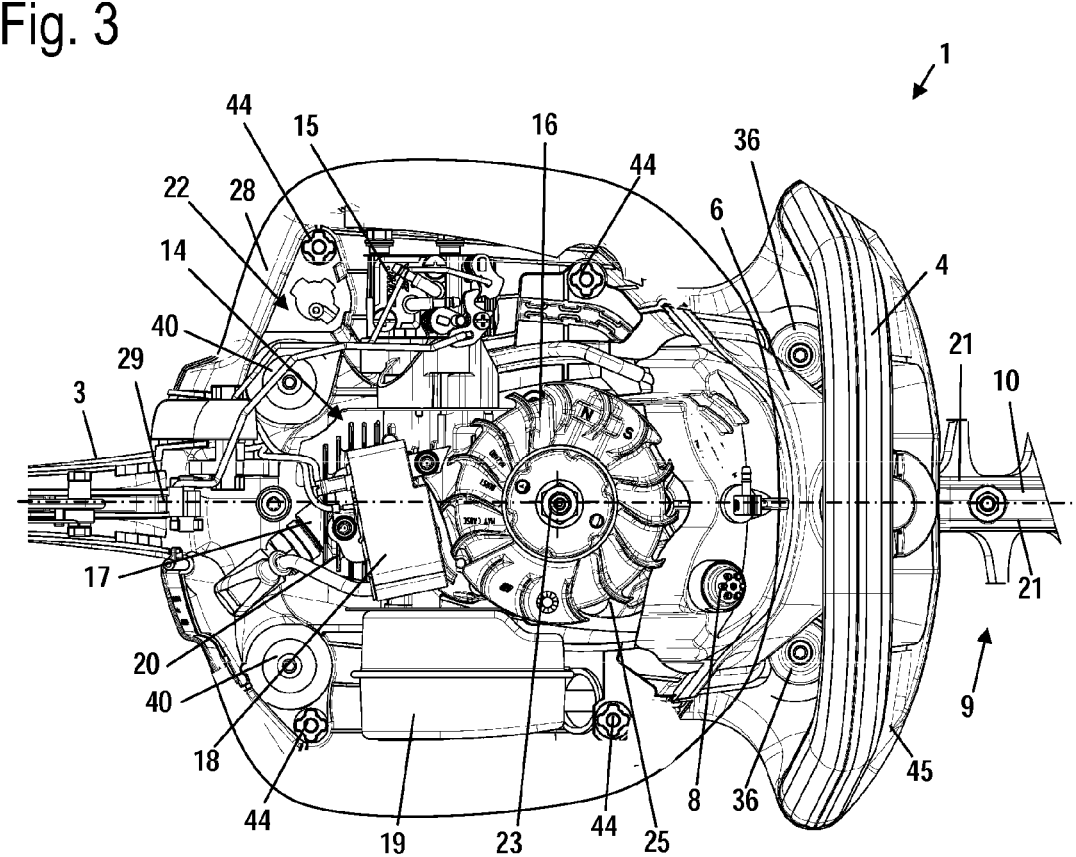
FIG. 3 is a plan view onto the hedge trimmer of FIG. 2, with the housing cover removed.

As shown in FIG. 3, a drive motor which is embodied as an internal combustion engine 14 is mounted in the handle housing 2. The internal combustion engine 14 is a one-cylinder engine, in particular a two-cycle engine. However, the internal combustion engine 14 can also be a mixture-lubricated four-cycle engine.

The internal combustion engine 14 is horizontally disposed in the handle housing 2. The internal combustion engine 14 has a crankcase 25 and a cylinder 20, into which extends a spark plug 17. In this connection, the cylinder 20 is disposed on that side of the handle housing 2 that faces the rear handle 3, while the crankcase 25 faces the tubular handle 4 and the blade arrangement 9. As a result, the distance b between the axis of rotation 24 of a crankshaft 23, which is rotatably mounted in the crankcase 25, and the blade arrangement 9 is significantly smaller than the distance a in the prior art. Provided on that side of the crankcase 25 that faces the blade arrangement 9 is a tank 6 for operating medium, in particular for fuel. The tubular handle 4 spans or extends over the tank 6, so that the tank is protected by the tubular handle 4 against external influences, such as impacts or the like. The tank 6 has a closure cap 7 that advantageously can be opened without a tool, and is disposed below the tubular handle 4. As a result, the closure cap 7 is protected against accidental opening. Also provided on the tank 6 is a venting valve 8.

The internal combustion engine 14 has a starter device, which acts upon a fan wheel 16 that is fixedly connected with a crankshaft 23 of the internal combustion engine 14. A starter grip 5, such as a rope pull, of the starter device extends out of the fan wheel cover 33 (FIG. 2).

As shown in FIG. 3, provided on the cylinder 20 is an ignition module 18 that supplies ignition energy to the spark plug 17. A carburetor 15 and an exhaust muffler 19 are disposed on the internal combustion engine 14. The internal combustion engine 14, together with the carburetor 15 and the exhaust muffler 19, forms a part of the drive unit 22.

The handle housing 2 is connected with the drive unit 22 by means of a total of four anti-vibration elements 36. Two of the anti-vibration elements 36 are disposed in the region of the tubular handle 4 on both sides of the longitudinal central axis 29. Two further anti-vibration elements 36, which are not shown in FIG. 3, are disposed in recesses 40 that are disposed in the handle housing 2 adjacent to the cylinder 20. To connect the housing cover 27 with the housing section 28, a total of four screw bosses 44 are provided on the housing section 28. The tubular handle 4 is secured to a support plate 45, which is monolithically formed with the handle housing 2.

Figure 4:
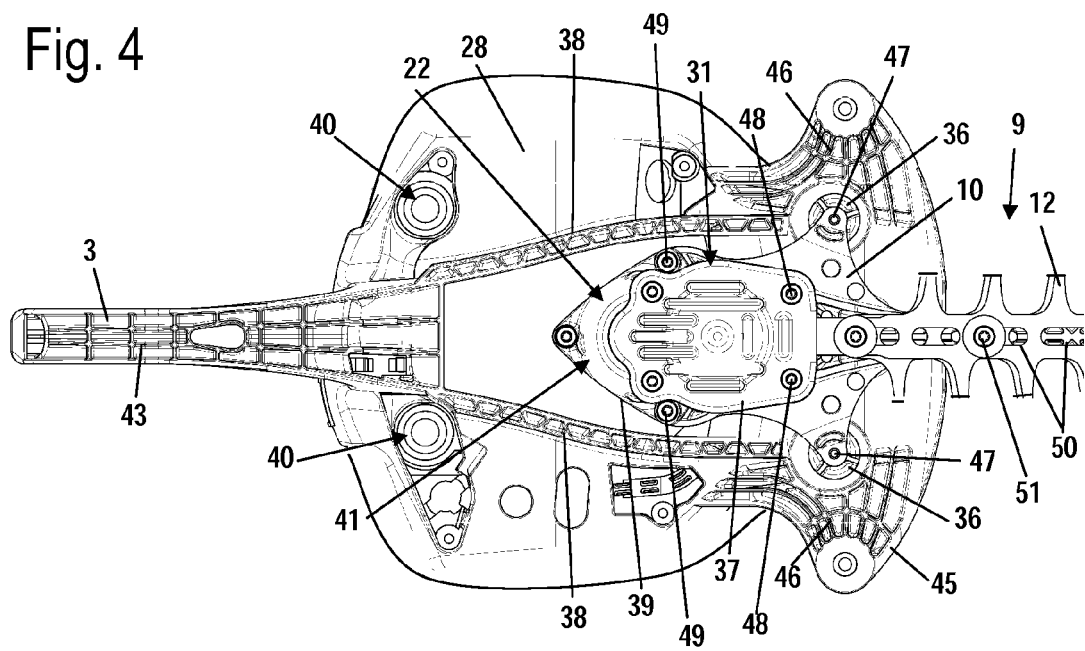
FIG. 4 is a view from below onto the hedge trimmer of FIG. 2.

As shown in FIG. 4, the underside of the housing section 28 has an opening 39 through which the drive unit 22 extends. In this connection, a vibration gap 41 is formed between the drive unit 22 and the rim of the opening 39. The vibration gaps 41 and 42 permit a relative movement of drive unit 22 and handle housing 2. The drive unit 22 includes a gearbox 31, which is threadedly connected with the guide means 10 at two fastening points 48. The gearbox 31 has a gearbox cover 37, through which the fastening or mounting screws extend. At two further fastening points 49, the guide means 10 is connected directly to the crankcase 25 of the internal combustion engine 14. Two further fastening points 47 are provided on the guide means 10 at which are disposed the anti-vibration elements 36 for connection with the handle housing 2. The term "fastening point" designates the location at which the guide means is secured, with the indicated threaded connection, in other words the position of the respective fastening screw.

As shown in FIG. 4, the handle housing 2 has a series of reinforcing ribs to increase the strength. The rear handle 3 is provided on its underside with a ribbing 43 comprised of longitudinal ribs and transverse ribs. Provided in the region of the housing section 28 are two longitudinal reinforcing ribs 38, which adjoin the ribbing 43 of the rear handle 3 and extend to within the region of the anti-vibration elements 36 provided for the connection with the guide means 10. The two longitudinal reinforcing ribs 38 extend in a looped or curved manner from the rear handle 3 to within the region of the anti-vibration elements 36, whereby the distance between the longitudinal reinforcing ribs 38 increases. Each longitudinal reinforcing rib 38 is formed of two lateral longitudinal ribs, which are interconnected by cross pieces that extend at an angle. The support plate 45 is provided with a ribbing 46 to increase the strength. In this connection, the ribbing 46 extends in the region disposed between the fastening points for the securement with the anti-vibration elements 36 and the fastening points for the connection with the tubular handle 4.

As shown in FIG. 4, each of the cutter bars 11, 12 has slots 50 through which extend the screws 51 that connect the guide means 10 with the two cutter bars 11 and 12.

Figure 5:
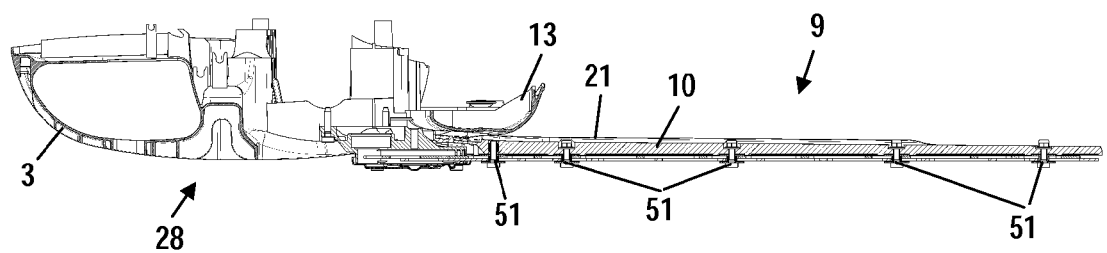
FIG. 5 is a longitudinal cross-sectional view through a housing section of the handle housing, and through the blade arrangement.

As shown in FIG. 5, the guide means 10 is connected to the cutter bars 11 and 12 by means of five screws 51. As also shown in FIG. 5, the housing section 28 is monolithically formed with the rear handle 3. Only a cover of the rear handle 3, which is not shown in FIG. 5, is embodied as a separate component. Also formed on the housing section 28 is a tank housing half shell 13.

Figure 6:
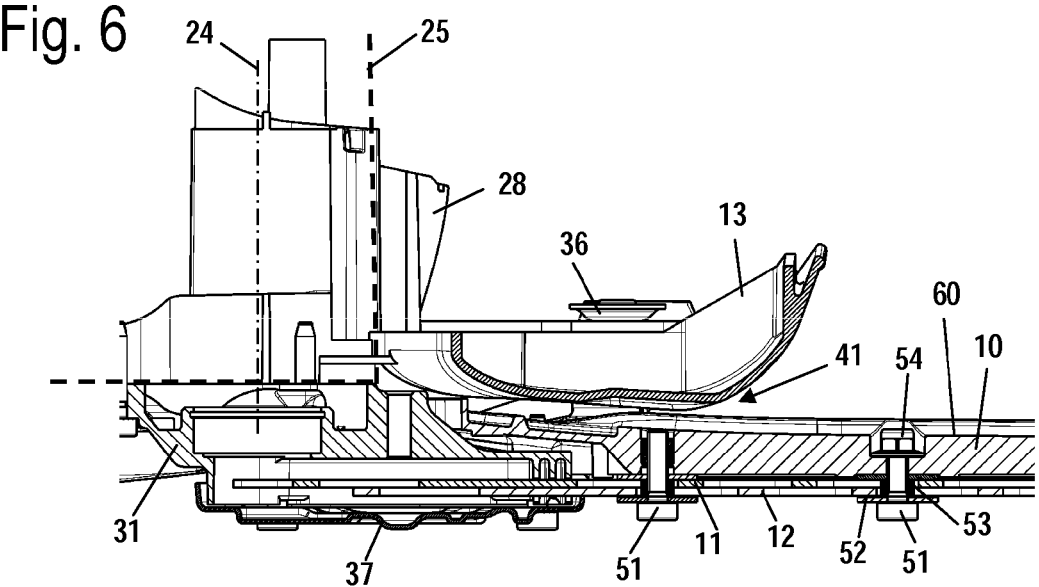
FIG. 6 is an enlarged view of the region of the gearbox of FIG. 5.

As shown in FIG. 6, one screw 51 is threaded directly into the guide means 10. The further screws 51, which are disposed remote from the gearbox 31, are held on the guide means 10 by nuts 54. In this connection, the nuts 54 are disposed on an upper side 60 of the guide means 10. Disposed below each head of the screws 51 is a disk or washer 52, which rests against the second cutter bar 12. A sliding guide 53 is provided between each pin of a screw 51 and the cutter bars 11 and 12.

Figure 7:
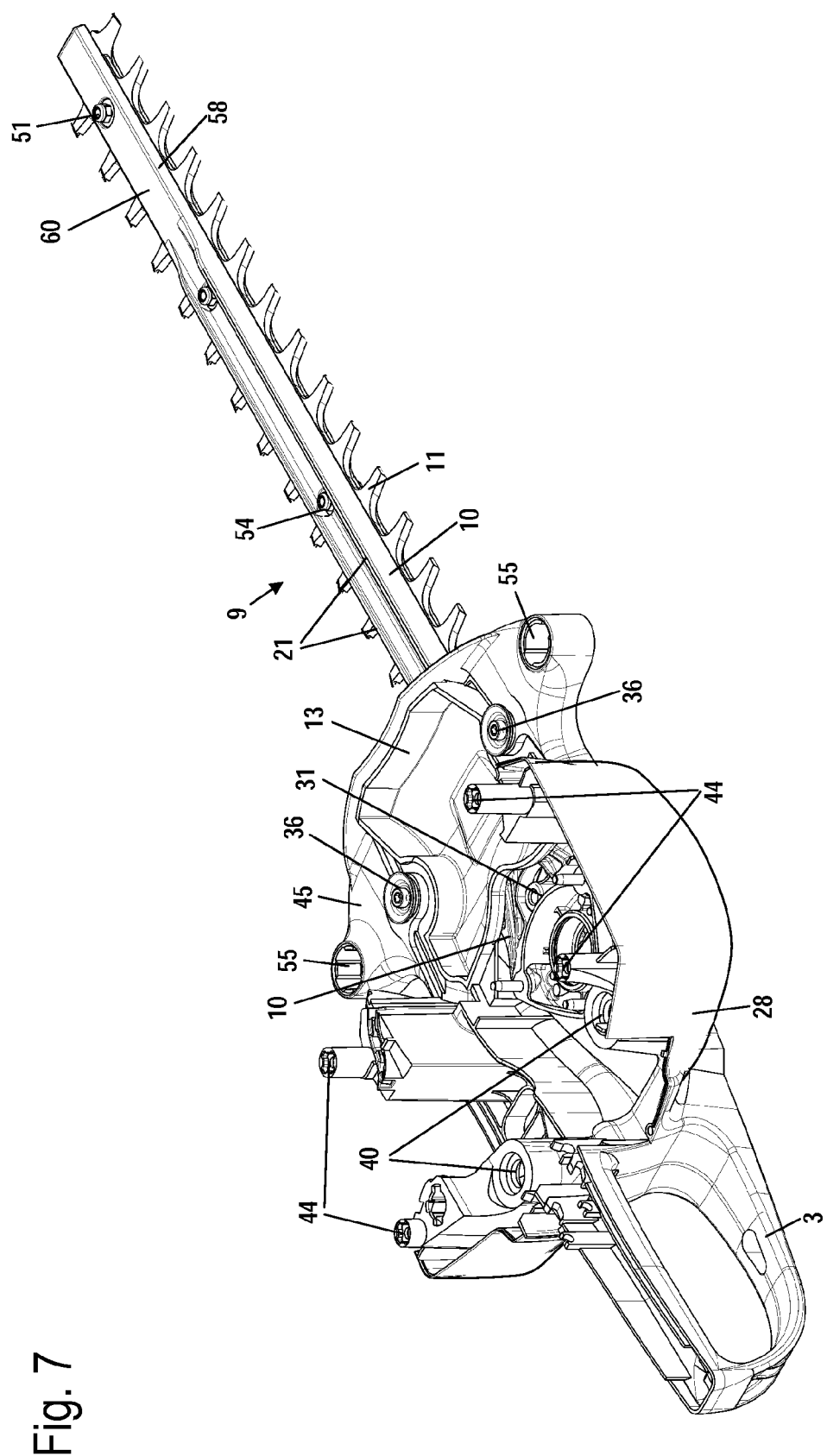
FIG. 7 is a perspective illustration of the arrangement of housing section and blade arrangement from FIG. 5.

As shown in FIG. 7, provided on the upper side 60 of the guide means 10 are two longitudinal ribs 21, which extend over a large portion of the length of the guide means 10 in a continuous manner. Only in the region of the screw 51 that faces the free end of the blade arrangement 9 are the longitudinal ribs 21 not provided. The guide means 10 has two longitudinal sides 58, which together with the upper side 60 form a U-profile that is open toward the cutter bars 11 and 12. The longitudinal ribs 21 extend on the upper side 60 as an extension of the longitudinal sides 58.

As shown in FIG. 7, provided on the support plate 45, which is monolithically formed with the housing section 28, are two receiving means 55 for the two ends of the tubular handle 4. The two receiving means 55 are disposed on the outwardly disposed sides of the support plate 45 and on both sides of the tank housing half shell 13.

Figure 8:
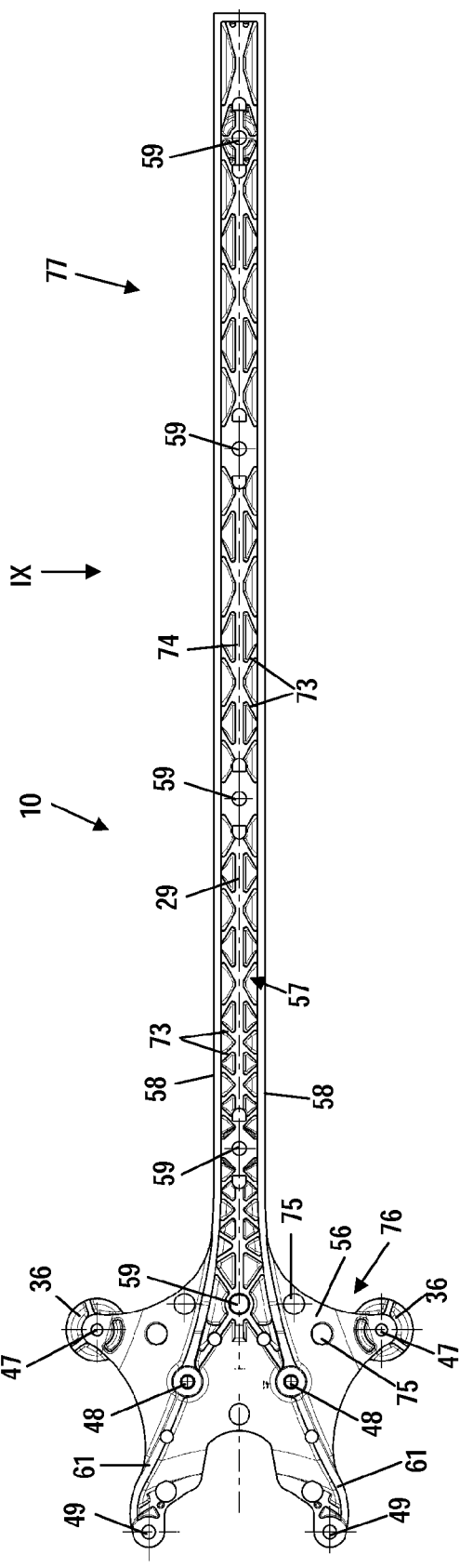
FIG. 8 is a view from below onto the guide means of the blade arrangement.
Figure 9:
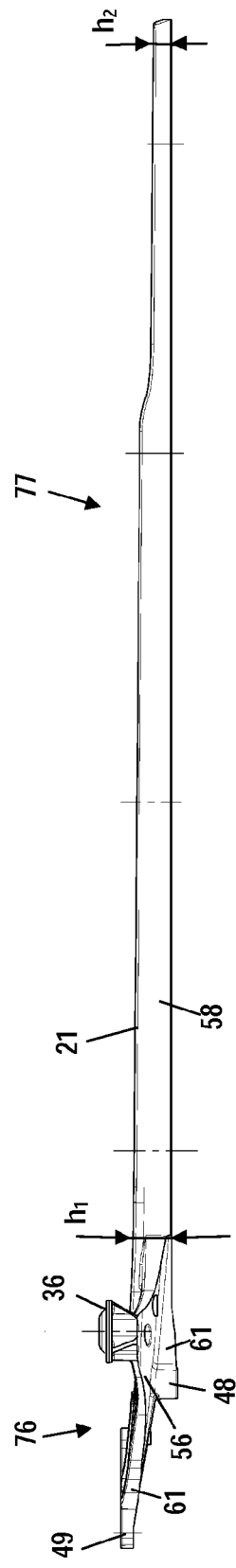
FIG. 9 is a side view taken in the direction of the arrow IX in FIG. 8.

FIGS. 8 and 9 show the composition of the guide means 10 in detail. The guide means 10 has a fastening portion 76, which is disposed in the region of the housing section 28 and on which are provided the fastening points 47, 48 and 49. Two of each of the fastening points 47, 48 and 49 are provided, and are disposed on both sides of the longitudinal central axis 29 of the hedge trimmer 1 and symmetrical relative thereto. The guide means 10 is furthermore provided with a guide portion 77, on which are mounted the cutter bars 11 and 12. For the connection to the cutter bars 11 and 12, the guide portion 77 has a total of five holes 59, through which the screws 51 (FIG. 5) extend. As shown in FIGS. 8 and 9, the guide means 10 is embodied as a molded part. The fastening portion 76 is embodied as a generally flat portion and has a fastening plate 56. In this connection, the fastening plate 56 can be provided with cutouts or the like to optimize weight. Provided on the fastening plate 56 are reinforcing ribs 61 that, from the fastening points 49 for the connection to the crankcase 25, extend in a curved manner to the fastening points 48 for the connection with the gearbox 31, and from there further to the guide portion 77, where the reinforcing ribs 61 merge with the longitudinal sides 58 of the guide portion 77. Provided in the fastening plate 56 are a total of four fastening openings 75 for fastening attachments such as, for example, a guide protector or a glide plate. In this connection, two fastening openings 75 are respectively disposed on each side of the longitudinal central axis 29.

The guide portion 77 has a ribbing 57 that is disposed in the interior of the U-profile, which is formed by the upper side 60 and the longitudinal sides 58, and in the space enclosed by the U-profile and the cutter bars 11 and 12. The ribbing 57 includes a longitudinal rib 74, which extends centrally in the guide portion 77 in the direction of the longitudinal central axis 29. The longitudinal rib 74 is connected with the longitudinal sides 58 via transverse ribs 73 that extend in a zigzagged manner. In this connection, in the region of the guide portion 77 that is adjacent to the fastening portion 76, the transverse ribs 73 are disposed very close together and extend relatively steeply relative to the longitudinal rib 74. As the distance from the fastening portion 76 increases, the transverse ribs 73 extend in a flatter manner and less closely together. Consequently, also the number of transverse ribs per unit of length, for example between adjacent holes 59, decreases. The number of transverse ribs 73 is thus adapted to the mechanical loading of the guide means 10.

As shown in FIG. 9, adjacent to the fastening portion 76 the guide portion 77, including the longitudinal ribs 21, has a height $h_1$. As the distance from the fastening portion 76 increases, the height of the guide means 10 in the guide portion 77 as measured perpendicular to the plane of the cutter bars 11, 12 decreases. At that end remote from the fastening portion 76, the guide means 10 only has a height $h_2$, which is significantly less than the height $h_1$. Also the height of the guide means 10 measured without the longitudinal ribs 21 continuously decreases from the fastening portion 76 to the free end of the guide portion 77.

FIGS. 10 and 11 show another exemplary embodiment of a guide means 10'. In this connection, the construction of the guide means 10' corresponds essentially to that of the guide means 10. The same reference numerals represent corresponding elements. The fastening portion 76 of the guide means 10' has only two fastening openings 75 for attachments. The guide portion 77 does not have continuously extending longitudinal ribs 21 on the upper side 60, but rather longitudinal ribs 71 that respectively extend only in the region of the holes 59. Thus, the longitudinal ribs 71 are disposed only in the regions in which the strength of the guide portion 77 is reduced due to the presence of the holes 59. Consequently, a tailored strength can be achieved, and differences in strength can be avoided. On the non-illustrated underside, the guide means 10' is provided with a ribbing 57 that advantageously corresponds to that of the guide means 10.

As shown in FIG. 11, the height h1 of the guide means 10' in the guide portion 77 continuously decreases from adjacent to the fastening portion 76 to the free end, where the guide means 10' has a height $h_2$. In this connection, the longitudinal ribs 71 are not taken into account.

Figure 12:
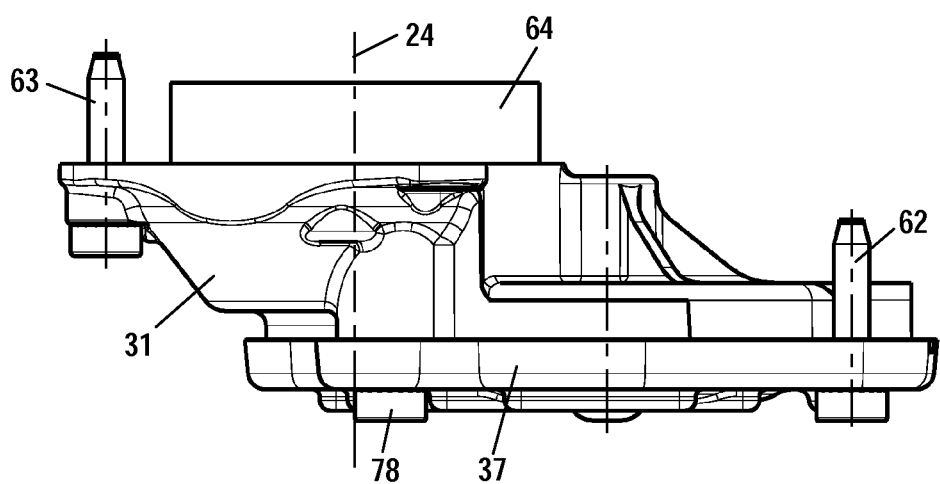
FIG. 12 is a side view onto the gearbox of the hedge trimmer.

The composition of the gearbox 31 is shown in FIG. 12. By means of first fastening screws 62, the gearbox 31 is connected with the guide means 10 at the fastening points 47. The gearbox 31 is directly connected to the crankcase 25 via a second fastening screw 63. The gearbox cover 37 is threadedly connected to the gearbox 31 via third fastening screws 78.

Figure 13:
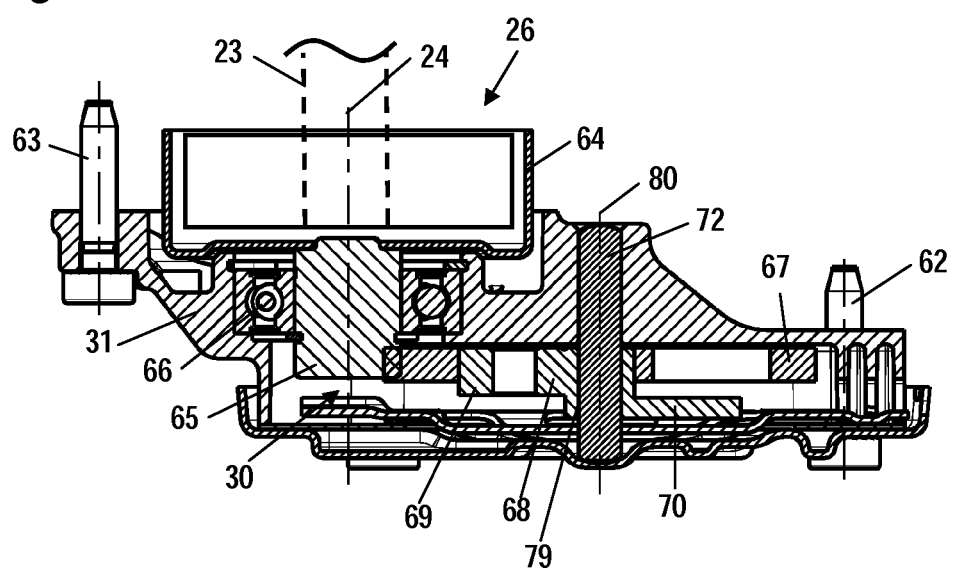
FIG. 13 is a longitudinal cross-sectional view through the gear mechanism of the hedge trimmer.

As shown in FIG. 13, the crankshaft 23 is connected to a gear mechanism 30 disposed in the gearbox 31 by means of a centrifugal clutch 26. Although not illustrated, the centrifugal clutch 26 includes centrifugal weights that cooperate with a clutch drum 64. The clutch drum 64 is connected with a driving pinion 65 so as to rotate therewith; the driving pinion 65 is part of the gear mechanism 30 and is mounted in the gearbox 31 via an anti-friction or roller bearing 66. The driving pinion 65 meshes with a toothed gear 67 on which are fixed a first cam or eccentric 69 and a second cam or eccentric 70. The two eccentrics 69 and 70 are embodied on a separate eccentric component 68 that is fixed on the toothed gear 67, advantageously being pressed therein. The eccentric component 68 is embodied as a sintered component, and has a bore 79 that is concentrically disposed relative to the axis of rotation 80 of the gear 67. A bearing pin or bolt 72, which is pressed into the gearbox 31, extends through the bore 79. The eccentric component 68 is mounted directly on the bearing bolt 72. This is possible due to the embodiment of the eccentric component 68 as a sintered component. The toothed gear 67 is mounted over the eccentric component 68, which is disposed in the region of the bearing bolt 72, so that no separate bearing is required for the mounting of the tooth gear 67. The cutter bars 11 and 12 are mounted directly on the eccentrics 69 and 70 without separate bearings. As shown in FIG. 13, both of the eccentrics 69 and 70 are disposed on one side of the toothed gear 67, namely on the underside that faces away from the internal combustion engine 14. Consequently, the cutter bars 11 and 12 can rest against one another over their entire length.

The guide means 10, 10' are die cast as molded parts, and are comprised of a lightweight metal, in particular magnesium. This results in a low weight of the guide means 10, 10'. Due to the die cast manufacture, it is easy to realize the provided embodiment as a molded part.

Figure 14:
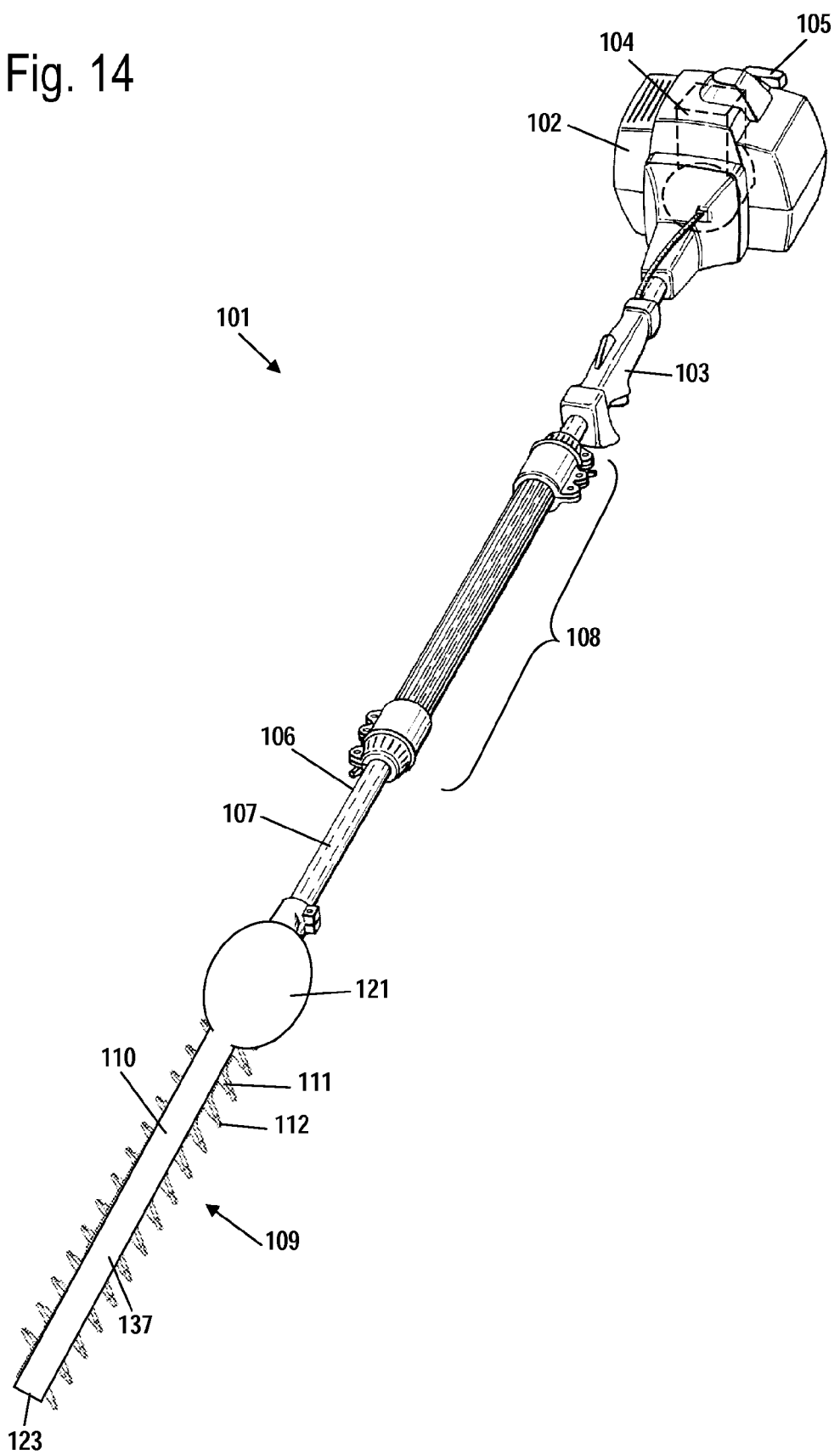
FIG. 14 is a schematic, perspective view of a hedge trimmer.

FIG. 14 shows an exemplary embodiment of a hedge trimmer 101, which has a housing 102 in which a combustion engine 104 as the drive motor is arranged. An electric motor also can be provided as the drive motor. A starter handle 105, which projects from the housing 102, serves for starting the combustion engine. The hedge trimmer 101 has a shaft 106, via which the housing 102 is connected with a blade arrangement 109. A drive shaft 107 that is rotatingly driven by the combustion engine 104 projects through the shaft 106. The shaft 106, according to the exemplary embodiment, has a telescoping section 108, with which the length of the shaft 106 is adjustable. The shaft 106, however, can have a fixed length. Between the telescoping section 108 and the housing 102, a handle 103 is secured to the shaft 106, which serves as a control element for controlling the internal combustion engine 104.

On the end of the shaft 106 facing away from the housing 102, a gearbox 121 is fixed to the shaft 106. The gearbox 121 is fixedly connected with a guide means 110, to which the cutter bars 111 and 112 of the cutting assembly 109 are moveably held in their longitudinal direction. In operation, forces acting on the cutter bars 111 and 112 perpendicularly to the cutting plane of the cutter bars 111 and 112 are conducted via the guide means 110 into the gearbox 121 and the shaft 106.

Figure 15:
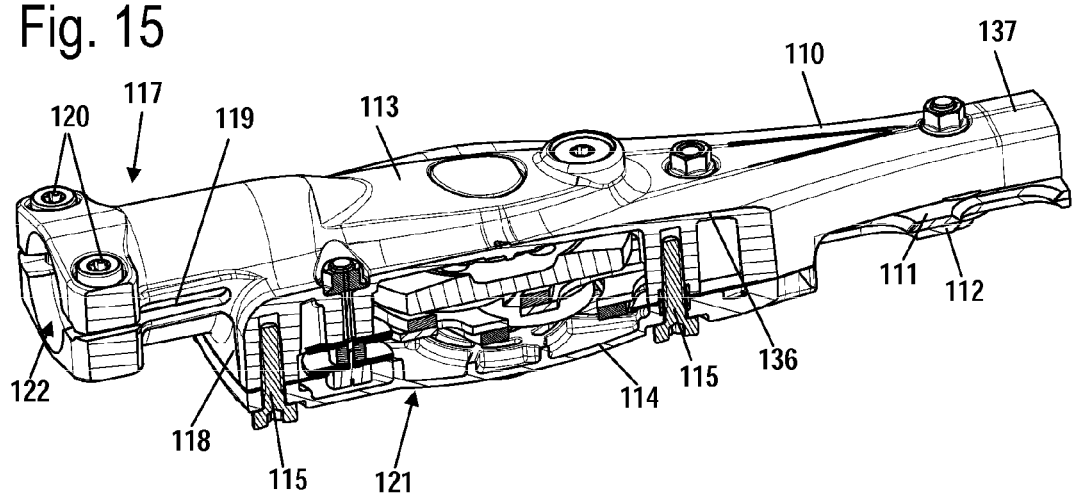
FIG. 15 is a perspective sectional view of an exemplary embodiment of a gearbox with the guide means of the hedge trimmer of FIG. 14.
Figure 16:
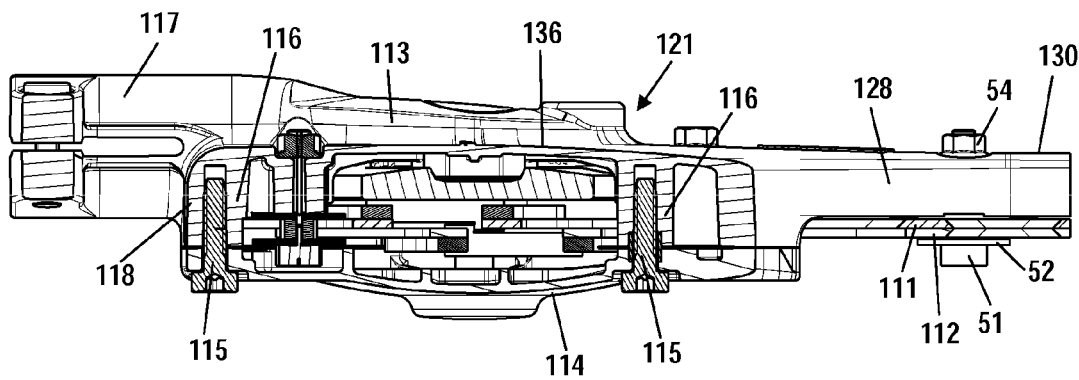
FIG. 16 is a sectional view of the gearbox with the guide means of FIG. 15.

FIGS. 15 and 16 show the design of the gearbox 121 in detail. The gearbox 121 is formed by a housing shell 113, to which a gearbox cover 114 is secured via attachment screws 115. The housing shell 113 is formed as one piece with the guide means 110.

The guide means 110 comprises a guide portion 137, which has an elongated design and on which the cutter bars 111 and 112 are held via screws 51, which are screwed into nuts 54 on the top of the guide means 110. A disc 52 is arranged between the head of the screw 51 and the two cutter bars 112 arranged adjacent to the head of the screw 51, which serves as a sliding disc. As shown in FIG. 14, the guide portion 137 extends over the entire length of the cutter bars 111 and 112 up to a free end 123 of the blade arrangement 109, which faces away from the gearbox 121.

The guide means 110 comprises a fastening portion 126, which forms a part of the housing shell 113. The fastening portion 136 comprises screw spikes 116, into which the attachment screws 115 are screwed. The fastening portion 136 is formed substantially flat. The screw spikes 116 thereby project from the plane of the fastening portion 136. For fixing the gearbox 121, a clamping section 117 is provided, which is formed on the housing shell 113 of the guide means 110. The clamping section 117 forms a receiving area 122, which is interrupted by slots 119 extending in the longitudinal direction of the receiving area 122 and into which the shaft 106 can be inserted. Clamping screws 120 serve to fix the clamping section 117 onto the shaft 106. Adjacent to the fastening portion 136, the gearbox 121 has a circumferential wall 116. On the front face of the circumferential wall 118, a gearbox cover 114 is arranged.

Figure 17:
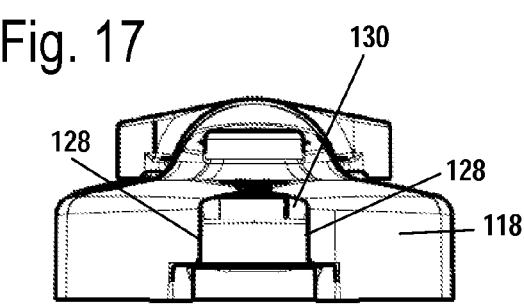
Figure 18:
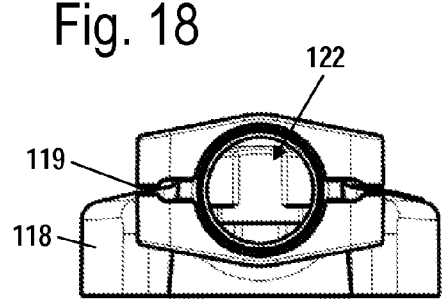

As shown in FIG. 17, the circumferential wall 118 mergers into the longitudinal sides 128 of the guide portion 137. The guide portion 137 comprises two opposite longitudinal sides 128, which are connected to one another via an upper side 130. The longitudinal sides 128, with the upper side 130, form an approximately U-shaped cross section. FIG. 18 also shows the design of the slots 119.

FIGS. 19 through 21 show the design of the guide means 110 in detail. The guide portion 137 has a plurality of holes 129, which serve for receiving the screws 51 for longitudinally adjustable fixing of the cutter bars 111 and 112 to the guide means 110. As shown in FIGS. 19 through 21, the fastening portion 136 extends on both sides of a central section 124 of the housing shell 113, which merges into the clamping section 117.

As FIG. 20 shows, adjacent to the gear box 121, the guide portion 137 has a height $h_1$ that is measured perpendicular to the plane of the cutter bar that is substantially greater than the height $h_2$ of the guide means 110 adjacent to the free end 123 of the guide means. As FIG. 21 shows, the guide portion 137 is defined by two opposite longitudinal sides 128, which are connected to one another by means of the upper side 130 at the side shown at the top of FIG. 19 and in the bottom of FIG. 21. The two longitudinal sides 128 form with the upper side 130 a U-profile, in which a ribbing 127 for increasing the stability of the guide portion 137 is arranged. The ribbing 127 includes a longitudinal rib 74, which is interrupted in parts, as well as transverse ribs 72, which run at a slant to the longitudinal direction of the guide 110. The ribbing 127 is denser in the region adjacent to the gearbox 121 than in the region of the free end 123. In this manner, a minimal weight of the guide means 110, and at the same time, a sufficiently greater stability, can be achieved. The weight of the guide means 110 according to the longitudinal section is less in the region adjacent the free end 123 than in the region adjacent to the gearbox 121.

As FIG. 21 shows, in the exemplary embodiment, the fastening portion 136 has four screw spikes 116, on which attachment openings 135 are formed for receiving attachment screws 115 (FIGS. 15 and 16). Also, however, a different number of attachment openings 135 can be provided advantageously. As FIG. 21 also shows, the housing shell 113 has reinforcement ribs 131 in the fastening portion 136.

Figure 22:
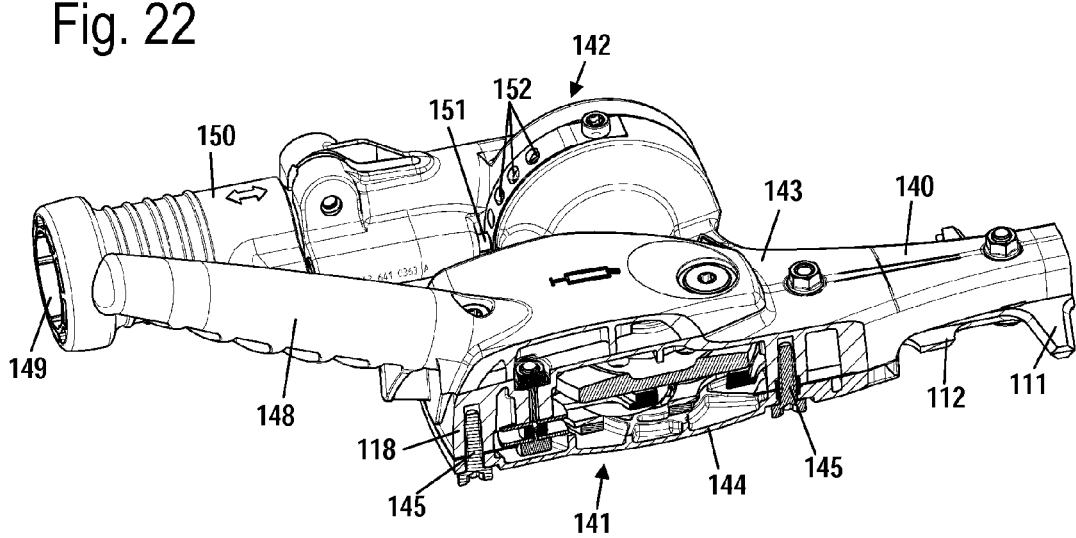
FIG. 22 is a perspective sectional view of an exemplary embodiment of a gearbox with the guide means of the hedge trimmer of FIG. 14.
Figure 23:
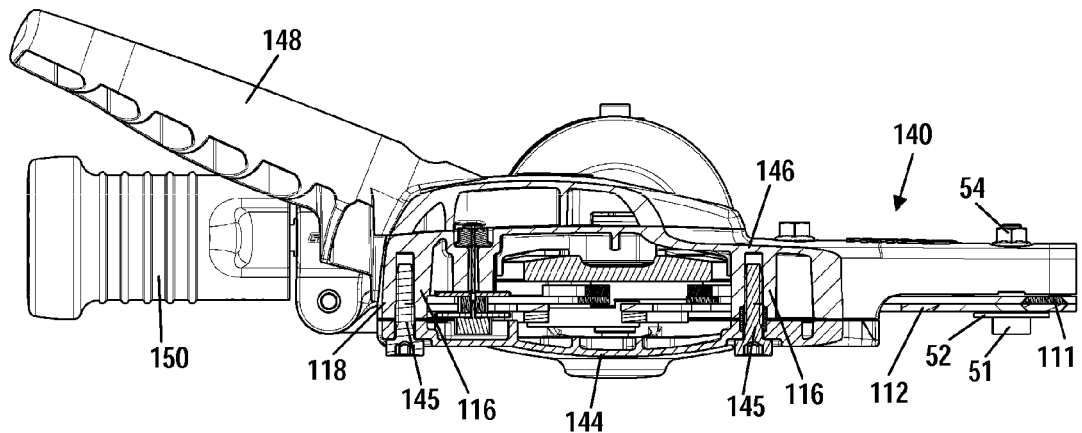
FIG. 23 is a sectional view of the gearbox with the guide means of FIG. 22.

FIGS. 22 through 28 show an exemplary embodiment of a guide means 140, which is provided for mounting to a hedge cutter 101. The guide means 140 is connected via an adjustment device 142 with the shaft 106. In this connection, the assembly has a receiver 149 for receiving a shaft 106. A section of the receiver 149 is arranged in an actuation section 150 for the adjustment device 142. As shown in FIG. 22, the adjustment device 142 has a pin 151, which is fixedly connected with the actuation section 150. The pin 151 can be arranged in various openings 152 of the gearbox 141, in order to provide different angular positions of the blade arrangement 109 relative to the shaft 106. For adjustment of the angular position, the actuation section 150 is displaceable relative to a gearbox 141 in the longitudinal direction of the shaft 106. A handle 148 is disposed on the gearbox 141, which enables an easy pivoting motion of the blade arrangement 109.

Figure 24:
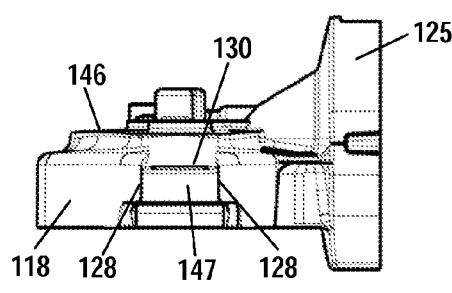
Figure 25:
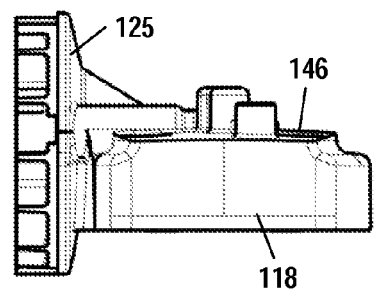

The guide means 140 includes a fastening portion 146, which is formed as one piece with a guide portion 147. The cutter bars 111, 112 are mounted to the guide portion 147. The fastening portion 146 forms a part of the gearbox 141, namely a part of a housing shell 143. The housing shell 143 is a part of the guide 140 and is formed as a one-piece, cast metal part with the guide portion 147. The fastening portion 146 has screw spikes 116, into which the attachment screws 145 are screwed. The number of screw spikes 116 and attachment screws 145 can be selected as desired. With the attachment screws 145, a gearbox cover 144 is fixed on the housing shell 143 of the guide means 140. The housing shell 143, with the gearbox cover 144, defines the gearbox 141. The fastening portion 146 is flat and substantially level. This is also shown in FIGS. 24 and 25. In addition, a housing shell 125 of the adjustment device 142 is formed as one piece on the guide means 140.

As shown in FIGS. 26 through 28, the design of the guide portion 147 corresponds approximately to the design of the guide portion 137 of the guide means 110 from FIGS. 15 through 21. The same reference numerals therefore designate in all figures components that correspond with one another. The flat, essentially level fastening portion 146 has a total of four screw spikes 116, to which attachment openings 135 for fixing of the gearbox cover 144 are provided. A housing shell 135 of the adjustment device 142 is formed on the guide means 140. Via the guide portion 147 and the housing shell 125 of the adjustment device 142, forces which act in operation on the cutter bars 111 and 112 are at least partially conducted into the shaft 106 (FIG. 14).

The specification incorporates by reference the disclosure of German priority document 10 2008 063 995.8 filed Dec. 19, 2008.

The present invention is, of course, in no way restricted to the specific disclosure of the specification and drawings, but also encompasses any modifications within the scope of the appended claims.

What I claim is:

1. A hedge trimmer comprising:
   a drive motor;
   a gear mechanism;
   a blade arrangement defining a longitudinal direction and having at least one cutter bar and having a free end;
   said at least one cutter bar being configured to be driven to move in a reciprocating manner in said longitudinal direction by said drive motor via said gear mechanism causing forces to develop during operation of the hedge trimmer which act on said blade arrangement;
   a supporting component for accommodating said blade arrangement thereon;
   said blade arrangement further including a guide unit for said at least one cutter bar;
   said guide unit being configured as a molded part having a profiled guide portion and a generally flat fastening portion;
   said generally flat fastening portion being configured to connect said blade arrangement to said supporting component so as to permit said guide unit to support said blade arrangement with respect to said supporting component and so as to conduct said forces at said fastening portion into said supporting component;
   said guide unit having a first and second end regions extending in said longitudinal direction;
   said first end region being mounted on said supporting component whereat said fastening portion is disposed;
   said second end region extending approximately to said free end of said blade arrangement;
   said profiled guide portion being arranged at least in part in said second end region;
   said generally flat fastening portion being configured so as not to extend into said second end region; and,
   said at least one cutter bar being longitudinally moveably guided on said profiled guide portion of said guide unit.

2. A hedge trimmer according to claim 1, wherein said profiled guide portion is provided with a ribbing.

3. A hedge trimmer according to claim 2, wherein said ribbing includes at least one transverse rib that extends transverse to the longitudinal direction of said blade arrangement.

4. A hedge trimmer according to claim 3, wherein a plurality of said transverse ribs are provided, and wherein said transverse ribs are more densely disposed in a region of said guide portion that faces said fastening portion than in a region of said guide portion that is remote from said fastening portion.

5. A hedge trimmer according to claim 2, wherein said ribbing includes at least one longitudinal rib that extends in the longitudinal direction of said blade arrangement.

6. A hedge trimmer according to claim 2, wherein said profiled guide portion is provided with an upper side and longitudinal sides that extend in the longitudinal direction of said blade arrangement, further wherein said longitudinal sides extend from said upper side in a direction toward said at least one cutter bar and form with said upper side a U-profile, and wherein said ribbing is disposed in the space enclosed by said upper side, said longitudinal sides, and said at least one cutter bar.

7. A hedge trimmer according to claim 1, wherein said profiled guide portion is provided with at least one hole for a connection to said at least one cutter bar, and wherein at least one longitudinal rib is disposed on a side of said profiled guide portion that faces away from said at least one cutter bar and at the level of said at least one hole.

8. A hedge trimmer according to claim 7, wherein said at least one longitudinal rib is disposed only in the vicinity of said at least one hole.

9. A hedge trimmer according to claim 1, wherein in a region that faces said fastening portion, said profiled guide portion has a first height measured perpendicular to a plane of said at least one cutter bar, further wherein in a region remote from said fastening portion, said profiled guide portion has a second height, and wherein said first height is greater than said second height.

10. A hedge trimmer according to claim 1, wherein said fastening portion is provided with at least one reinforcing rib, further wherein said profiled guide portion is provided with longitudinal sides that extend in the longitudinal direction of said blade arrangement, and wherein at least one of said longitudinal sides merges into one of said reinforcing ribs.

11. A hedge trimmer according to claim 1, wherein said drive motor is an internal combustion engine having a crankcase, and wherein said fastening portion is connected to said crankcase at least at one fastening point.

12. A hedge trimmer according to claim 1, wherein said gear mechanism is disposed in a gearbox, and wherein said fastening portion is connected to said gearbox at least at one fastening point.

13. A hedge trimmer according to claim 1, which further comprises a handle housing and a drive unit, wherein said drive unit includes said drive motor, said gear mechanism and said blade arrangement, further wherein said drive unit is mounted in said handle housing in a vibration-dampening manner via at least one anti-vibration element, and wherein said fastening portion is connected to said handle housing at least at one fastening point via an anti-vibration element.

14. A hedge trimmer according to claim 1, wherein said fastening portion includes at least one fastening opening for a securement of attachments.

15. A hedge trimmer according to claim 1, wherein said guide unit is a die cast part of lightweight metal.

16. A hedge trimmer comprising:
a drive motor;
a gear assembly including a gear box and a gear mechanism mounted in said gear box;
a blade arrangement defining a longitudinal direction and having at least one cutter bar and having a free end;
said at least one cutter bar being configured to be driven to move in a reciprocating manner in said longitudinal direction by said drive motor via said gear mechanism causing forces to develop during operation of the hedge trimmer which act on said blade arrangement;
said blade arrangement further including a guide unit for said at least one cutter bar;
said guide unit being configured as a molded part having a profiled guide portion and a generally flat fastening portion;
said generally flat fastening portion being fixedly connected to said gear box so as to permit said guide unit to support said blade arrangement with respect to said gear box and so as to conduct said forces at said fastening portion into said gear box;
said guide unit having a first and second end regions extending in said longitudinal direction;
said first end region being arranged at said gear box whereat said fastening portion is disposed;
said second end region extending at least partially over a part of a length of said blade arrangement;
said profiled guide portion being arranged at least in part in said second end region;
said generally flat fastening portion being configured so as not to extend into said second end region;
said at least one cutter bar being longitudinally moveably guided on said profiled guide portion of said guide unit; and,
said first end region of said guide unit being fixedly connected to said gear box at said fastening portion.

\* \* \* \* \*